United States Patent
Herkstroeter et al.

(10) Patent No.: US 7,389,618 B1
(45) Date of Patent: Jun. 24, 2008

(54) PREFABRICATED PANELS FOR TEMPORARY STRUCTURES

(76) Inventors: Shawn Herkstroeter, E5034 429th Ave., Menomonie, WI (US) 54751; Nathan A. Mielke, 8109 Buckhorn La., Loveland, CO (US) 80538; Jerome E. Johnson, Jr., 8425 720th Ave., Elk Mound, WI (US) 54739; Andy Schieber, 21416 County 19, Spring Grove, MN (US) 55974

( * ) Notice: Subject to any disclaimer, the term of this patent is extended or adjusted under 35 U.S.C. 154(b) by 587 days.

(21) Appl. No.: 11/100,704

(22) Filed: Apr. 7, 2005

Related U.S. Application Data

(60) Provisional application No. 60/560,759, filed on Apr. 9, 2004.

(51) Int. Cl.
*E04B 2/74* (2006.01)
(52) U.S. Cl. .................. 52/285.3; 52/584.1; 52/591.5
(58) Field of Classification Search .......... 52/79.5, 52/79.9, 38, 235, 285.1, 285.3, 394, 409, 52/416, 489.1, 582.1, 584.1, 586.1, 588.1, 52/578, 592.1, 591.4, 800.12, 800.17, 591.5; 446/108, 110–112; 40/607.14, 611.12; 403/293, 403/353, 388, 392; 211/40
See application file for complete search history.

(56) References Cited

U.S. PATENT DOCUMENTS

| | | | |
|---|---|---|---|
| 3,236,014 A | 2/1966 | Edgar | |
| 3,594,969 A * | 7/1971 | Kantorowicz | 52/392 |
| 4,003,167 A | 1/1977 | Saunders | |
| 4,104,838 A | 8/1978 | Hage et al. | |
| 4,115,938 A * | 9/1978 | Belmuth et al. | 40/730 |
| 4,408,427 A | 10/1983 | Zilch | |
| 4,534,146 A | 8/1985 | Preston | |
| 4,646,497 A | 3/1987 | Hoenle | |
| 4,984,406 A | 1/1991 | Friesen | |
| 5,078,530 A * | 1/1992 | Kim | 403/24 |
| 5,331,778 A | 7/1994 | Mazpule | |
| 5,337,535 A | 8/1994 | Maupin | |
| 5,651,220 A * | 7/1997 | dit Felix | 52/81.5 |
| 5,746,325 A * | 5/1998 | Lee | 211/40 |
| 5,921,047 A | 7/1999 | Walker | |
| 6,101,777 A * | 8/2000 | Bodine et al. | 52/506.06 |
| 6,185,878 B1 | 2/2001 | Bullard, III et al. | |
| 6,216,410 B1 | 4/2001 | Haberman | |

* cited by examiner

*Primary Examiner*—Robert Canfield
*Assistant Examiner*—Bryan Eppes
(74) *Attorney, Agent, or Firm*—Tipton L. Randall

(57) ABSTRACT

The invention is a building panel and clip system, in which the building panel members are quickly and reversibly attached to other similar building panel members with clip members to form a temporary structure that provides shelter from the elements. Alternatively, the building panel members are erected interior an existing structure to provide partitioning of the space therein. The building panel members are used to form both vertical walls and the roof for such an exterior structure. The building panel members may incorporate a door or a window for added versatility.

20 Claims, 18 Drawing Sheets

PREFABRICATED PANELS FOR TEMPORARY STRUCTURES

CROSS-REFERENCE TO RELATED APPLICATIONS, IF ANY

This application claims the benefit under 35 U.S.C. §119(e) of co-pending provisional application Ser. No. 60/560,759, filed 9 Apr., 2004. Application Ser. No. 60/560,759 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a system for constructing temporary structures. More particularly, the invention relates to a panel and clip system for constructing temporary structures. Most particularly, the invention relates to a panel and clip system employing standardized panels and releasable clips for constructing temporary structures.

2. Background Information

It is often required that temporary structures be erected for a variety of purposes. The structures can be erected out of doors to provide individuals shelter from the elements or erected interior an existing structure to provide partitioning of the space therein. Because the temporary structures are dismantled after having served their purpose, it is desirable that the components used to erect the structure be easy to assemble and disassemble, readily stackable for transport or storage, as well as reusable for reasons of economy. Likewise, the components of the structure are preferably fabricated from standard sized materials of suitable durability, again for availability and economy.

Some examples of building fabrication systems for which patents have been granted include the following.

Edgar, in U.S. Pat. No. 3,236,014, describes mating structural members in the nature of panels, which are assembled together to form the floor, walls and roof of a building. Each panel has an integral joint component extending entirely or almost entirely about its periphery. More specifically, using a four foot by eight foot wall panel as an example, the top is provided with a male joint member and the bottom with a female joint member each four feet long, while the sides carry male and female members respectively, eight feet long. A joint between panels is formed between a male joint-forming member of one panel and a female joint-forming member of the other panel. The male joint-forming member comprises a tongue which projects from the periphery of the panel made, in the preferred form, of a blunt wedge-shared hollow elongated channel member having terminal flanges anchored in the panel, preferably directly inside the facing. In the female joint member, a channel member is countersunk in the body of the panel, preferably with its flanges bonded to the interior of the panel facing members and the edges of the flanges being coextensive with the edges of the facing. The female channel member is of blunt wedge-shaped internal contour adapted to mate with the male member. In the actual joint, the exposed surfaces of the male and female members are in contact, and the ends of the facings of the respective panels abut to form a continuous insulated wall. There is an effective weather-proof seal at the joint when the panels are mated, with no direct passage from one side of the panel to the other, but only a circuitous line of contact between the faces of the male and female channel members.

In U.S. Pat. No. 4,003,167, Saunders discloses a lightweight cabin construction fabricated of a plurality of readily available lumber and plywood parts. The parts are worked to render them easily interfitting. All of the cabin construction materials may be easily transported in knocked-down condition and are designed to be easily assembled on the job site. The invention also includes a portable foundation which can be employed with the cabin construction for assembly at the job site.

Hage et al., in U.S. Pat. No. 4,104,838, describes a wall assembly that includes one or more panels each supported at its end edges by a removably attached post having releasable retainer means at the top and bottom thereof, engageable with top and bottom mounting clips carried by each panel end edge. Each clip is provided with an insertable leg and transversely secured within the free ends, respectively, of an edge channel attached to each panel end edge, while a tongue projects outwardly from each clip and extends inwardly toward the medial portion of the post. A fastener means associated with each top and bottom retainer means is activated to securely clamp each clip tongue within the respective end of the post to rigidly connect the panel thereto. Removable force-fitting trim means is attachable to the panel top and top retainer to provide a smooth, planar construction along the top of the wall assembly.

In U.S. Pat. No. 4,408,427, Zilch discloses a framing system for demountable walls, in which the frame member provides a substantially continuous backing surface to engage the back sides of panels along abutting edges thereof. The frame member is provided with separate locking means at spaced intervals along the backup surface, having locking portions which project into the edges of abutting panels to retain the panels against the backing surface. Such locking means are proportioned to fit into kerfs formed in the edges of the panel and are shaped to provide a camming action to press the back sides of the panel into snug engagement with the backup surface. The framing members may be, for example, furring strips formed of metal to secure the wall to a foreign wall, or a stud providing opposed backup surfaces for use in a wall providing panels along both sides thereof. In one form of the invention, the locking means are formed by integral tabs cut from the material of the backup surface so that the locking means do not require any additional material. In another form of the invention, the locking means are formed as separate clips which can be mounted along the backup surface at intervals. In the latter form of the invention, the framing member can be used, without such locking clips, with standard drywall construction, or with locking clips for a demountable wall construction.

Preston, in U.S. Pat. No. 4,534,146, describes an improved partition panel structure. The structure comprises a framed panel member, the vertical frames of which include extended locking members snap-on facings covering the open outer surface of at least the vertical frames. The snap-on facings have an opening for allowing the locking member to pass through and slots on each upper side surface end for engagement with the ends of the horizontal frame members. This slot engagement and the upper surface engagement of the locking member, with the opening through the snap-on facing, prevent relative movement between the snap-on facing and vertical frame member. A post or upright includes openings through its vertical surfaces for engagement with the inner angled surface of the downward extending distal end of the locking member. When assembled, the components form a rigid, reusable, locked together, panel partition structure.

In U.S. Pat. No. 4,646,497, Hoenle discloses a coupling unit that includes a pair of parts, mounted on respective panels, each on an axis extending through the panel. The panels are moved into coupling position, with the parts thereby in interconnecting position, with elements of the parts interlocking and their coincident axes. The two parts are then rotated on their common axis. Two units are used together, in spaced apart relation. In one form of the device, the parts of each unit are identical, and in another form, they are respectively of male and female shapes.

Friesen, in U.S. Pat. No. 4,984,406, describes a building system that includes a plurality of building panels which are connected together to form a wall structure and are then connected to roof panels to form a roof structure. Each of the panels is formed by rotational molding to form a hollow body. The hollow body can be filled with a foam insulation material. Side edges of the hollow body include either a projection or a correspondingly shaped recess which has a web and a bulbous part of increased width on the outer end of the web, so that the panels can be connected only by longitudinal sliding movement. Metal plates are embedded in the top and bottom surfaces for connection to metal plates in the roof panels and to a footing respectively. A rib on the front surface of the panel has a width on the order of one third the width of the panel and extends from the front surface of the panel substantially equal to the thickness of the panel so as to provide sufficient longitudinal strength in the panel that the weight of the roof can be supported wholly upon the panels. Corner, window and door panels are provided to complete the system.

In U.S. Pat. No. 5,331,778, Mazpule et al. disclose portable enclosure designed to be mounted in any desirable location and including a plurality of wall segments arranged in a vertically stacked array. Each wall segment includes a plurality of wall panels interconnected to one another so as to partially surround and thereby define a vertically oriented interior of sufficient dimension and configuration to house a person in an upstanding position. Supplementary attachments, including a hose bib and water supplying hose or like water source, may be attached such that the person within the interior of the enclosure may take a shower. Anchor structures are provided to secure the enclosure to the ground or other applicable supporting surface. The various components of the enclosure assembly may be easily assembled and disassembled to facilitate storage and/or transport. In another embodiment the portable enclosure may be positioned in a horizontal enclosure, and the position may be used as a sleeping enclosure. A main entrance is disposed in contiguous relation to the supporting ground, and one open end now defines the "crawl in" entrance for the person, to be housed when sleeping adjacent the portable enclosure.

Maupin, in U.S. Pat. No. 5,337,535, describes a panel system and method for building construction in which standing seam panels are attached to one another, such that the inner flange of one panel attaches to the outer flange of an adjacent panel, and the tongue of the inner flange is received by the groove of the outer flange. Multiple panels are joined together to form wall, ceiling, and roof sections. Clips are used to secure wall sections to ceiling sections.

In U.S. Pat. No. 5,921,047, Walker discloses a building structure having prefabricated, interfitting structural parts comprising wall panels forming an enclosure and roof panels forming a peaked roof structure above the enclosure. The wall panels are preferably joined by duplicate spaced wall panel connector elements. The roof panels preferably forming the peaked roof structure are joined to abutting roof panels at their side edges by duplicate spaced roof panel connector elements. These connector elements, in one embodiment, can embody duplicate spaced protrusions and recesses of appropriate size and shape. The adjacent upper ends of the roof panels are joined together by a roof ridge connector. The roof ridge connector is appropriately angled to match the slope of the peaked roof structure. The peaked roof structure is supported above the enclosure by the top edges of the wall panels. A roof connecting strip would preferably be attached to the bottom surface of the peaked roof structure near the unconnected ends of the roof panels and interfit with the connector elements along the upper horizontal edges of the wall panels.

Bullard, III et al., in U.S. Pat. No. 6,185,878, describe a utility shed comprising modular side panels which are connected together by corner connectors and in-line connectors to form sidewalls. The connectors have an I-beam cross section and comprise U-shaped ends which engage relatively wide channels to securely hold the wall panels together. A door assembly is provided for engaging the corner connectors and includes pivot pin members which are attached to the vertical channel of corner connectors and allow pivotal door panels to be suspended therefrom. Floor panels and lid panels are provided, compatible with the I-beam edge configuration of the side panels, such that the lid, floor and sidewalls mutually interlock with high structural integrity. The modularity of the side panels allows for enclosures of larger or smaller size to be created using the same panel components.

In U.S. Pat. No. 6,216,410, Haberman discloses a wall member with a first side having a tongue extending therefrom, a second side having a headed tongue extending therefrom, a third side having a groove defined therein for receiving a tongue of an adjacent panel, and a fourth side having a groove and cavity defined therein for slide-lock receiving of a headed tongue of an adjacent panel. The wall member may have a surface with a recess defined therein, and ribs extending from the recess. Also, the wall member may have a generally square, trapezoidal, hexagonal, or octagonal planar shape. Apertures may be defined in the tongue and grooves for aligning and receiving a dowel to lock panels together. A first corner section is defined by longitudinally extending the profile of the tongue through the profile of the headed tongue. A second corner section is defined by longitudinally extending the profile of the third side groove through the profile of the headed tongue. A third corner section is defined by longitudinally extending the profile of the fourth side groove and cavity through the third side groove. A fourth corner section is defined by longitudinally extending the profile of the fourth side groove and cavity through the tongue. Alternate embodiments provide corner panels, curved panels, and curved corner panels.

Applicants have devised a panel and clip system employing standardized panels and releasable clips for constructing temporary structures that overcome many of the short comings of the above described building systems.

SUMMARY OF THE INVENTION

The invention is directed to a building panel and clip system, in which the building panel members can be quickly and reversibly attached to other similar building panel members with clip members to form a temporary structure that can provide shelter from the elements, or erected interior an existing structure to provide partitioning of the space therein. The building panel members are used to form both vertical walls and the roof for such an exterior structure. The building panel members are also used to form partitions interior an existing structure.

The building panel members of the present invention are provided in two standard configurations, one rectangular and one triangular. Preferably, the rectangular panel members have dimensions of 4 feet by 8 feet, so that the panels can be fabricated from standard sized sheeting material for reasons on economy. The 4 feet by 8 feet panel members are readily stacked in the bed of a truck for transport. In addition, rectangular panel members with dimensions of 2 feet by 8 feet, 3 feet by 7 feet, and 4 feet by 4 feet are suitable for combination with the 4 feet by 8 feet panel members to provide added flexibility in erecting structures. The triangular panel members, preferably, are right triangles with each side adjacent the right angle having a length of 4 feet. In addition, triangular panel members with each side adjacent the right angle having a length of 3 feet can be used. The rectangular and triangular panel members are combined in a variety of configurations to provide a temporary structure of suitable dimensions. The panel members are readily assembled and disassembled to afford a reusable and easily transported structure. When joining a vertical panel member to another panel member forming a portion of the roof of a structure, the clip members for joining the wall and roof panel members include a cinch strap portion that attaches to the rectangular roof panel member.

Both the rectangular and triangular panel members are composed of a planar outer portion and an inner frame portion that is held in a spaced relationship from the planar outer portion by a peripheral spacer portion, thereby forming an interior channel beneath an interior edge of frame member. The frame portion is secured adjacent the peripheral edges of the planar outer portion and offset slightly from two adjacent edges of the planar outer portion. Thus, the outer portion forms a lip on two adjacent sides of the panel members, and the frame portion forms a lip on the other two adjacent sides of the rectangular panel members or a lip on the remaining side of the triangular panel members. Consequently, two such panel members can be abutted to form an overlapping joint to provide a functional, weather tight seal.

The frame portion of each panel member includes a plurality of notches on the interior edge thereof. The notches are spaced around the entire interior edge of the frame portion. With two panel members abutted, the notches of the frame portion are positioned such that the notches are aligned in pairs on the abutted frame portions. A clip member includes a slot that is inserted over two aligned notches and then the clip member is laterally offset from the notches to hold the two panel members together. The clip members include finger portions for positioning within the abutted frame portion's interior channels, and also include tapered surfaces within the slot for contacting the interior edge of the frame portion to securely fasten the clip member to the frame portion and hold the panel members together. The panel members can be fastened collinearly to form a wall or a partition, or perpendicularly to form a vertical corner or a horizontal roof structure. The triangular panel members are employed atop the rectangular panel members to provide a gabled end for the structure and impart a pitch to the roof portion of the temporary structure.

The clip members for the linear joining of panel members incorporate a C-shaped cross section with a linear slot having the pair of tapered surfaces in opposition to each other, while the corner clip members for the vertical corner or the horizontal roof structure have an asymmetrical cross section with an L-shaped slot having the pair of tapered surfaces positioned at 90 degrees to each other. A special foot clip member is provided for attachment to a panel member edge portion resting on a horizontal surface, with the foot clip member providing stability for the vertical panel member.

Because the frame portion is secured to the periphery of the planar outer portion of the panel member, a door or window opening can be present in the central portion thereof. With the rectangular panel members having a dimension of length that is twice the width (4 feet by 8 feet), the panel member's longer sides can be joined together or the shorter sides of two panel members can be joined to one longer side of another panel member to provide a continuous structure. Preferably, the outer portion of the panel member is made from a durable, rigid, synthetic material, while the frame portion can be made of the same material or wood. The clip members can be fabricated from metal, wood, or synthetic material.

DESCRIPTION OF THE EMBODIMENTS

Nomenclature

10 Building Panel and Clip System
20 Rectangular Panel Member
25 Planar Outer Portion of Panel Member 27 Peripheral Edges of Panel Member
30 Frame Portion of Panel Member
35 Spacer Portion of Panel Member
37 Interior Channel of Frame Portion
40 First Lip Section
45 Second Lip Section
50 Notches in Frame Portion
55 Interior Edge of Frame Portion
60 C-shaped Clip Member
62 Linear Slot of C-shaped Clip Member
65 Tapered Contact Surface of C-shaped Clip Member
67 Finger Portions of C-shaped Clip Member
70 Corner Clip Member
72 L-shaped Slot of Corner Clip Member
75 Tapered Contact Surface of Corner Clip Member
77 Finger Portions of Corner Clip Member
80 Triangular Panel Member
85 Planar Outer Portion of Panel Member
87 Peripheral Edges of Panel Member
90 Frame Portion of Panel Member
95 Spacer Portion of Panel Member
97 Interior Channel Frame Portion
100 First Lip Section
105 Second Lip Section
110 Interior Edge of Frame Portion
120 Foot Support Clip Member
122 Linear Slot in Foot Support Clip Member
125 Tapered Contact Surface of Clip Member
127 Finger Portion of Foot Support Clip Member
130 Planar Outer Contact Surface of Clip Member
135 Door Member Mounted in Panel Member
140 Window Member Mounted in Panel Member
150 Flexible Linear Bracing Member
170 Inside Corner Clip Member
172 L-shaped Slot of Inside Corner Clip Member
175 Tapered Contact Surface of Inside Clip Member
177 Finger Portions of Inside Corner Clip Member
180 Roof Clip Member
182 Angled L-shaped Slot of Roof Clip Member
185 Tapered Contact Surface of Roof Clip Member
187 Finger Portions of Corner Roof Clip Member Construction A building panel and clip system comprises a plurality of building panel members of selected shape and selected dimensions. Each panel member includes a planar exterior portion and a planar peripheral frame portion, spaced a selected distance from and attached to the exterior portion by a peripheral spacer portion, thereby forming an interior channel beneath an interior edge of the frame member. The frame portion contains a plurality of notches on the interior edge thereof, with the frame portion laterally offset from the exterior portion, thereby forming a lip on at least two edges of the panel member. A plurality of clip members are used for fastening abutted panel members together. Each clip member includes a slot for accepting frame portions therein and finger portions for positioning within the frame portion's interior channel. The clip member is inserted over a pair of aligned frame notches on abutted panel members. The clip member spans the frame portions of abutted panel members and is displaced laterally on the frame portions relative to the aligned notches, with each clip member's finger portions secured within one frame portion's interior channel, thereby reversibly securing abutted panel members together.

Figure 1:
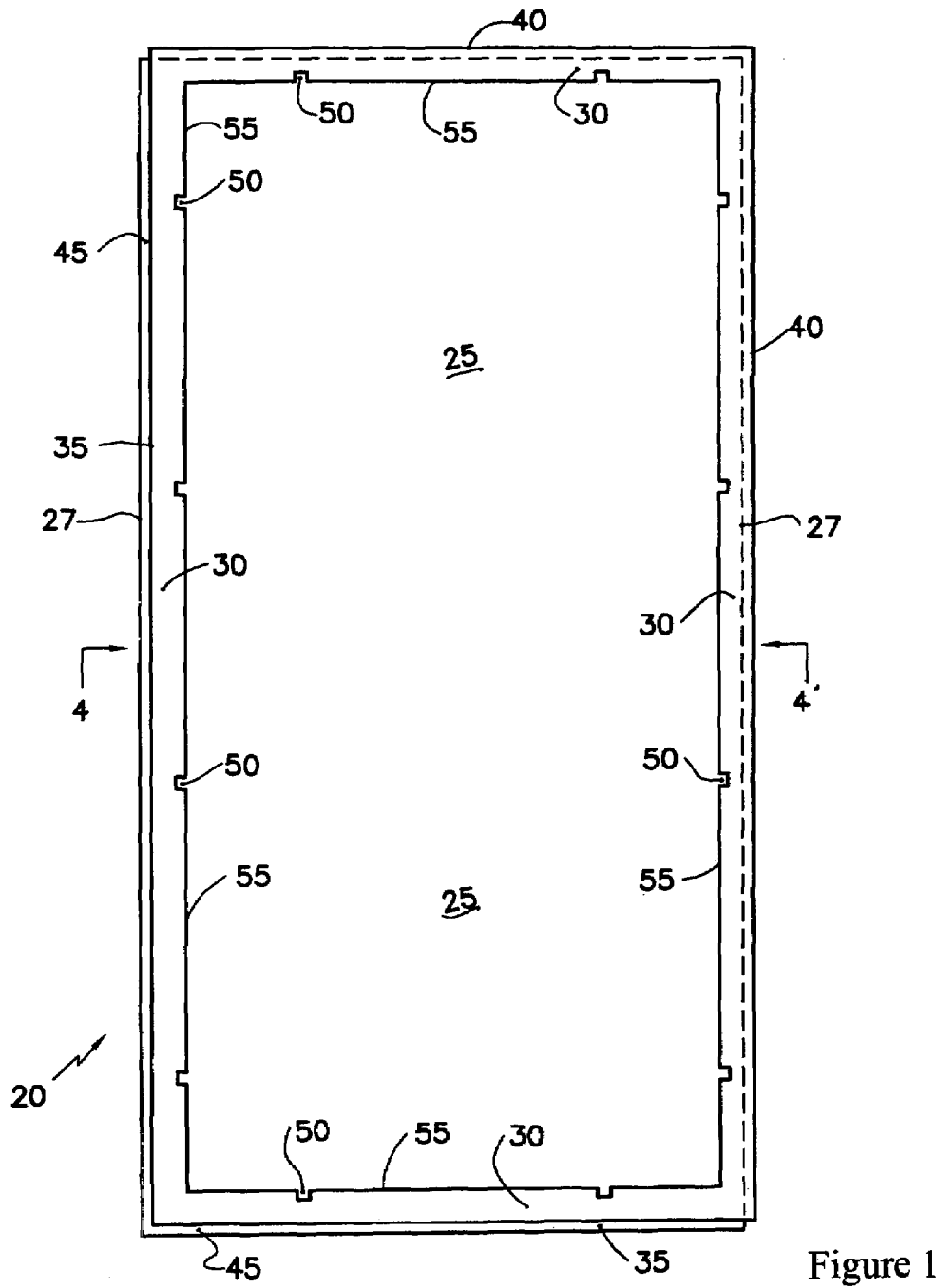
FIG. 1 is a plan view of a rectangular panel member of the present invention.
Figure 2:
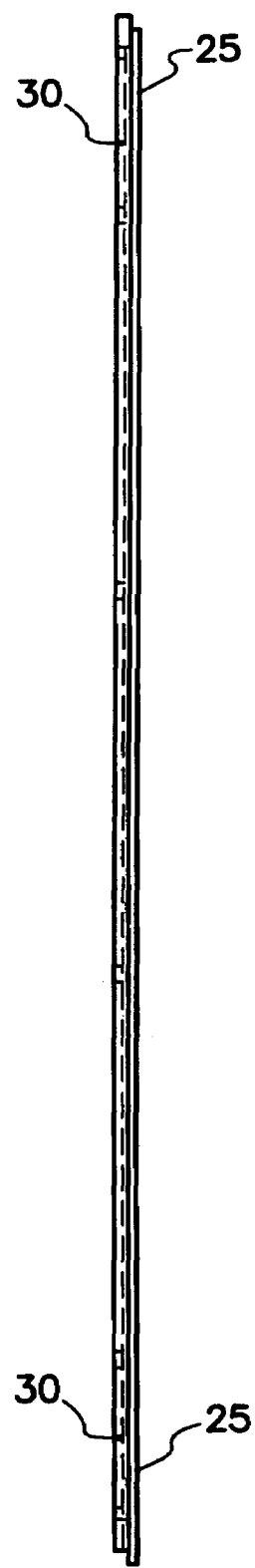
FIG. 2 is a side view of a rectangular panel member of the present invention.
Figure 3:
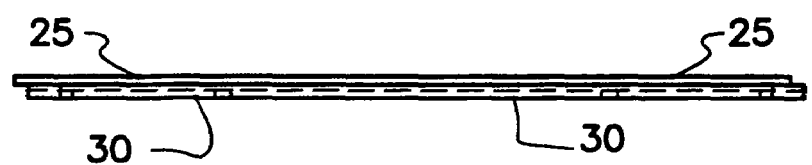
FIG. 3 is an end view of a rectangular panel member of the present invention.
Figure 4:
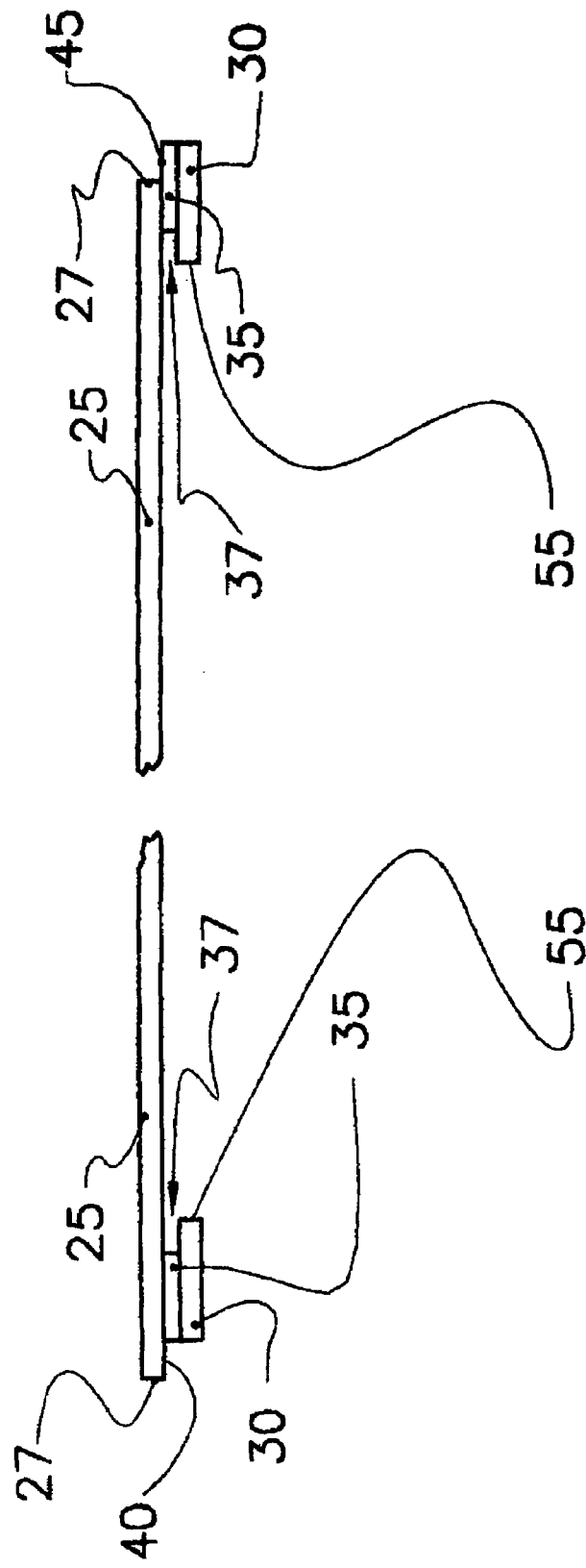
FIG. 4 is a cross sectional view along line 4-4' of FIG. 1 of the rectangular panel of the present invention.

Referring to FIGS. 1-3, a rectangular panel member 20 of the building panel and clip system 10 of the present invention is shown. The rectangular panel member 20 is composed of a planar outer portion 25 and an inner frame portion 30 that is held in a spaced relationship from the planar outer portion 25 by the spacer portion 35. In this embodiment, a spacer portion 35 separates the inner frame portion 30 from the planar outer portion 25, thereby forming an interior channel 37 between the outer portion 25 and the inner frame portion 30, as illustrated in FIG. 4. The frame portion 30 is secured adjacent the peripheral edges 27 of the planar outer portion 25 and offset slightly from two adjacent edges of the planar outer portion 25. Thus, the planar outer portion 25 forms a first lip section 40 on two adjacent sides of the panel member 20, and the frame portion 30 forms a second lip section 45 on the other two adjacent sides of the panel member 20. Consequently, two such panel members 20 can be abutted to form an overlapping joint to provide a functional, weather tight seal there between.

Figure 5:
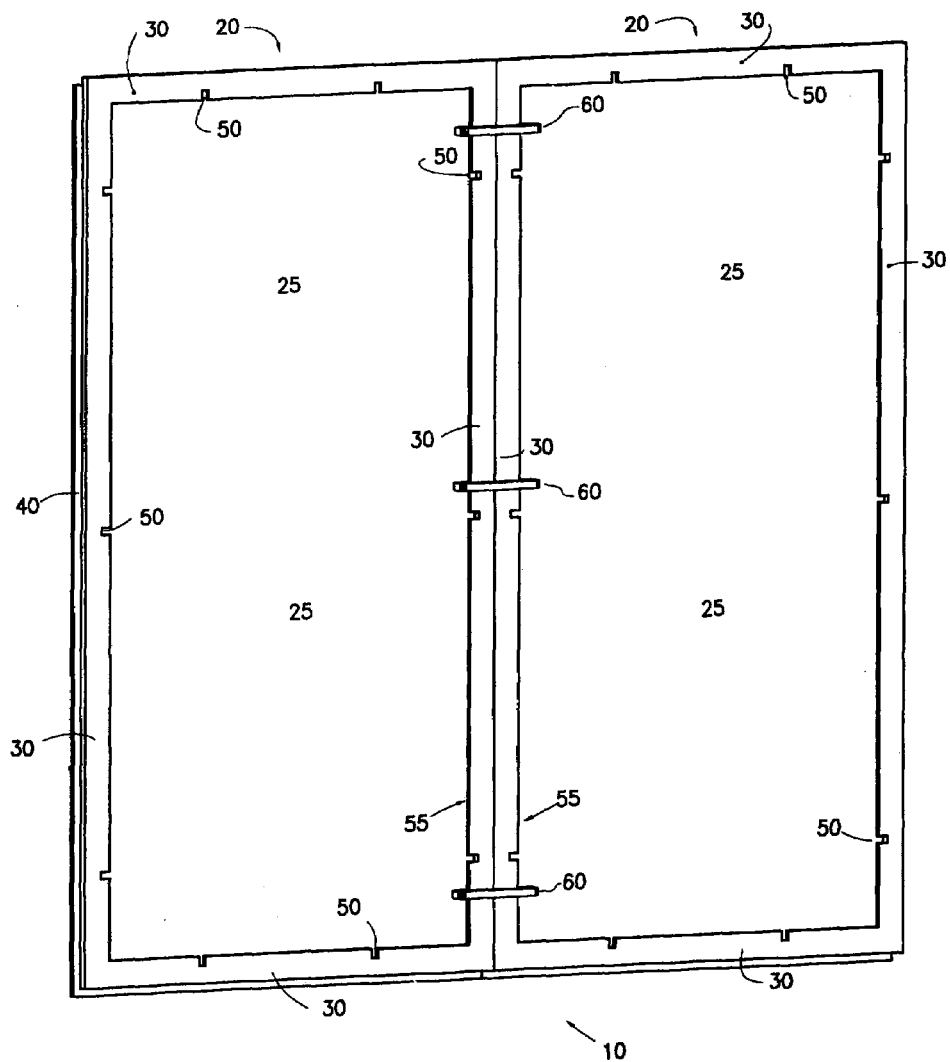
FIG. 5 is a perspective view of two abutted rectangular panel members of the present invention.
Figure 6:
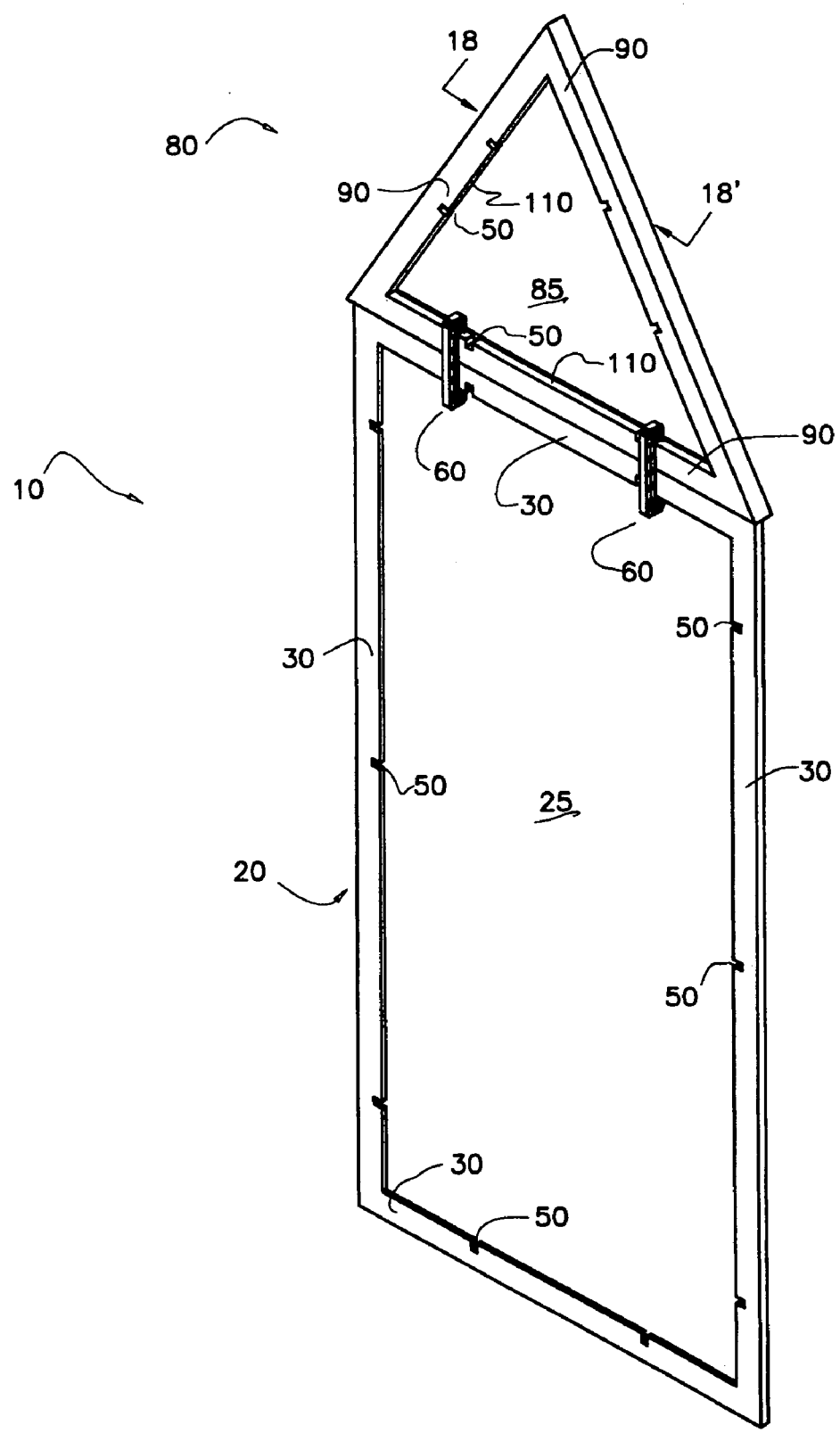
FIG. 6 is a perspective view of a triangular panel member abutted with a rectangular panel member of the present invention.
Figure 7:
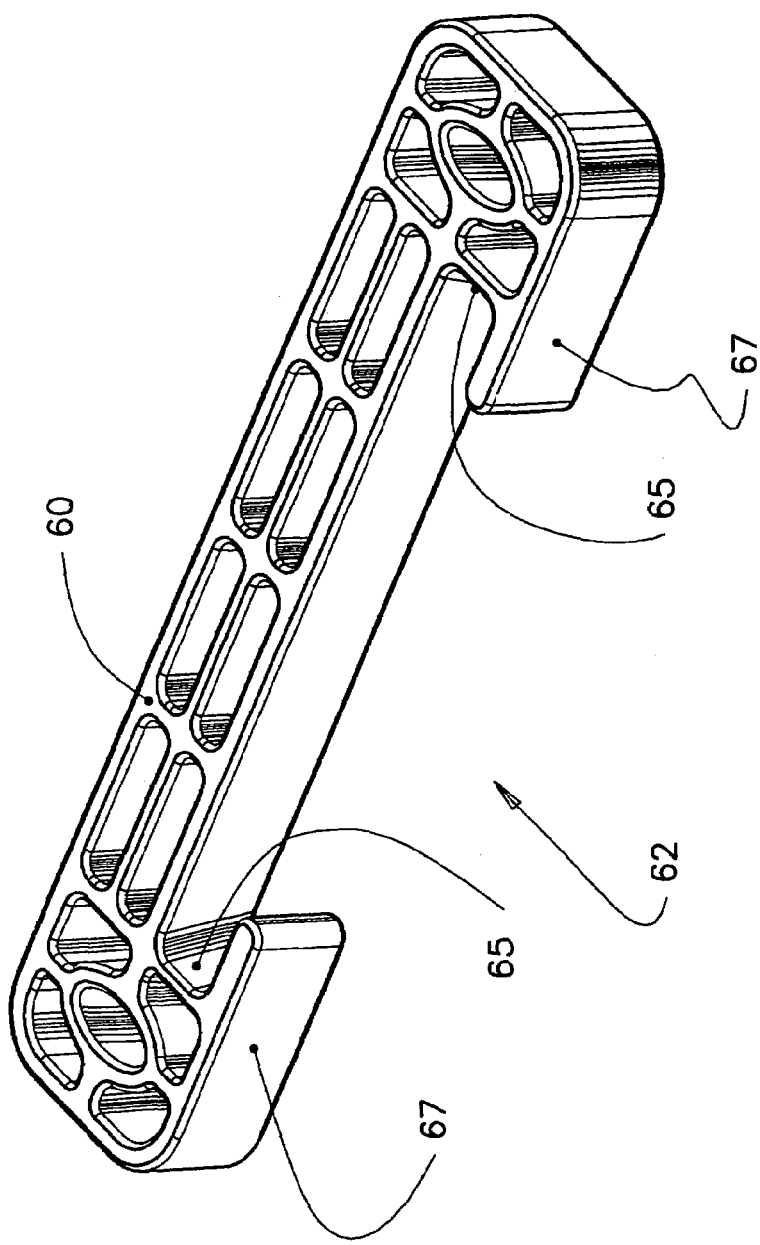
FIG. 7 is a perspective view of a C-shaped clip member of the present invention.
Figure 8:
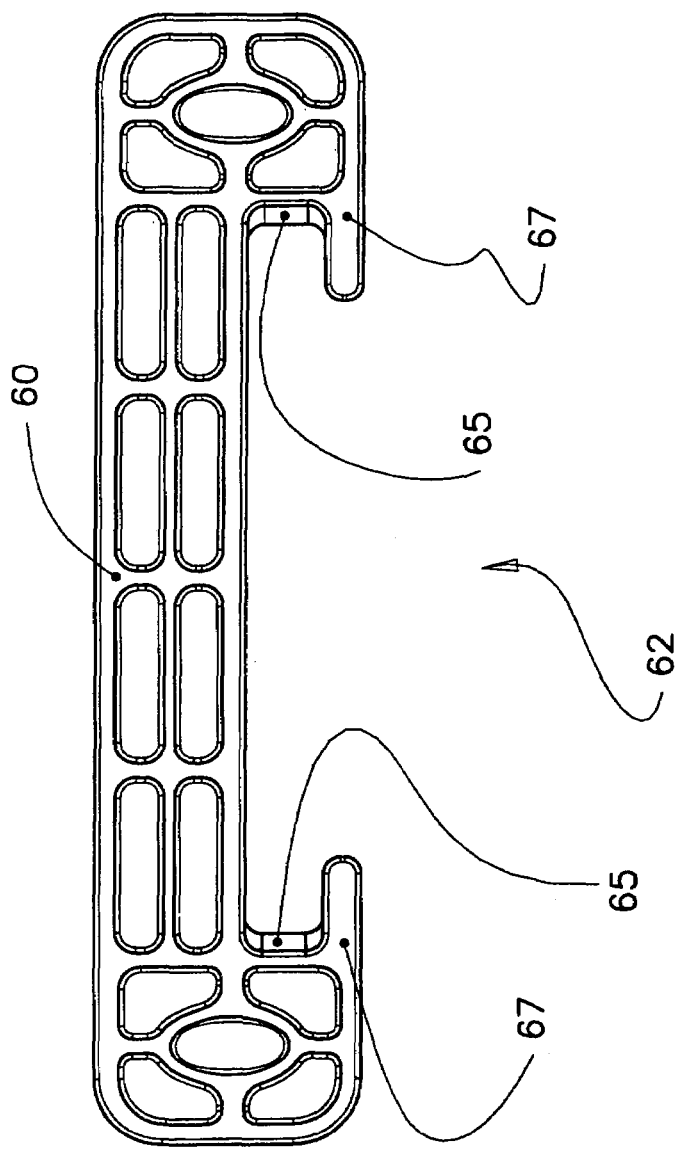
FIG. 8 is a top view of a C-shaped clip member of the present invention.

The frame portion 30 of each panel member 20 includes a plurality of notches 50 on the interior edge 55 thereof. The notches 50 are spaced around the entire interior edge 55 of the frame portion 30. With two panel members 20 collinearly abutted, as shown in FIG. 5, the notches 50 of each panel member's frame portion 30 are positioned such that the notches 50 are aligned in pairs on the abutted frame portions 30. A C-shaped clip member 60 having a linear slot 62 therein, as shown in FIGS. 7 and 8, is inserted over two aligned notches 50, and then the clip member 60 is laterally offset from the notches 50 to hold the two panel members 20 together. The C-shaped clip member 60 includes finger portions 67, each of which fit into the interior channel 37 between the interior edge 55 of the frame portion 30 and the planar outer portion 25 of one abutted panel member 20. The C-shaped clip members 60 have tapered contact surfaces 65 on the opposed portions contacting the interior edges 55 of the frame portion 30 to securely fasten the C-shaped clip member 60 to the frame portion 30 and hold the panel members 20 together. The notches 50 in the frame portion 30 are slightly wider than the thickness of the C-shaped clip members 60 to allow easy passage of the finger portion 67 of the clip member 60 through the notch 50. The lateral movement of the C-shaped clip member 60 causes the tapered contact surface 65 thereof to contact the interior edges 55 of the frame portion 30 of each abutted panel member 20, thereby drawing the abutted surfaces of the panel member 20 into close contact with each other. Preferably, several C-shaped clip members 60 are employed to secure two panel members 20 together, as illustrated in FIGS. 5 and 6. The panel members 20 can be fastened linearly to form a wall/partition, as illustrated in FIGS. 5, 11 and 12.

Figure 9:
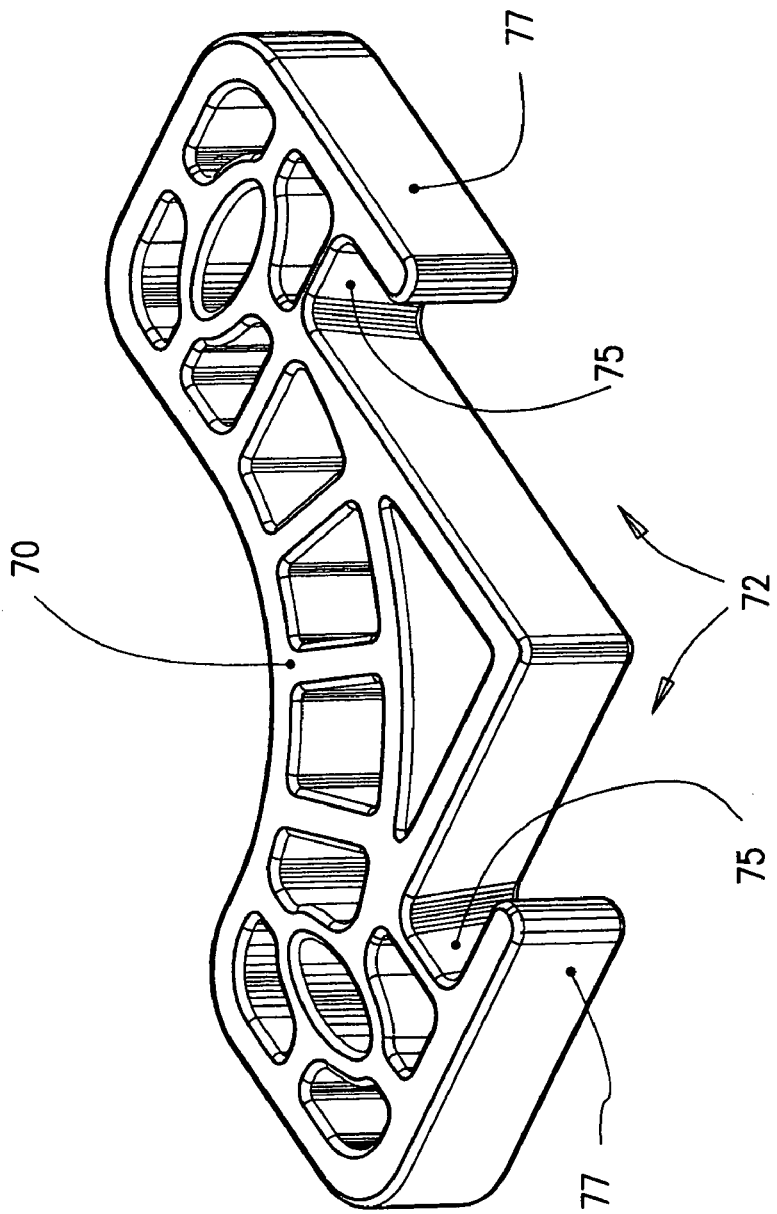
FIG. 9 is a perspective view of an asymmetrical corner clip member of the present invention.
Figure 11:
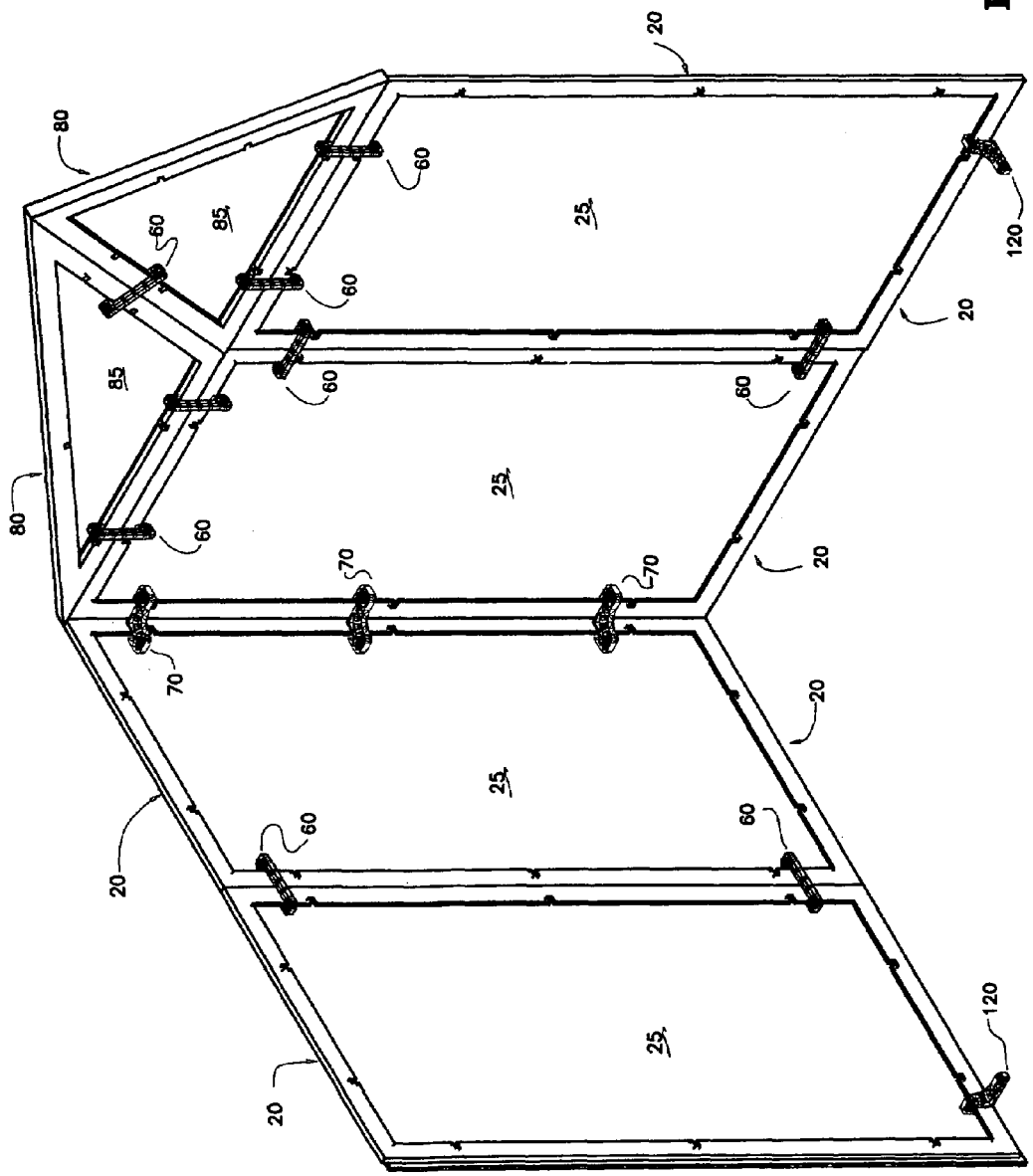
FIG. 11 is a perspective interior view of a portion of a structure formed from rectangular and triangular panel members of the present invention.
Figure 12:
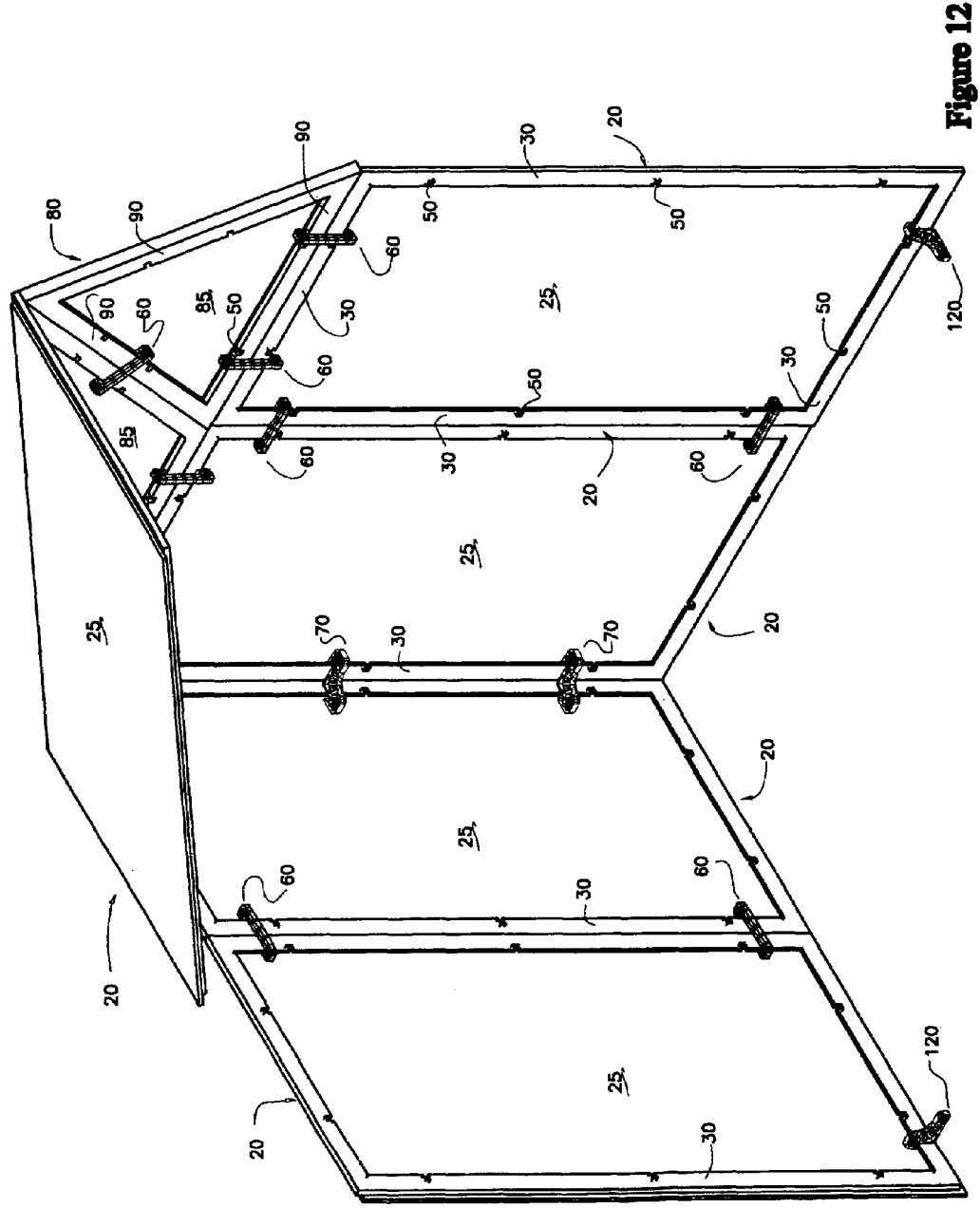
FIG. 12 is a perspective interior view of a further portion of a structure formed from rectangular and triangular panel members of the present invention.

Alternatively, the panel members 20 can be fastened perpendicularly to form a vertical corner or a horizontal roof structure, as illustrated in FIGS. 11 and 12. In this configuration, an asymmetrical corner clip member 70, illustrated in FIG. 9, is employed. The corner clip member 70 includes an L-shaped slot 72 with tapered contact surfaces 75 positioned at 90 degrees to each other for contacting the interior edges 55 of the frame portion 30. The corner clip member 70 includes finger portions 77, each of which fit into the interior channel 37 between the interior edge 55 of the frame portion 30 and the planar outer portion 25 of one, perpendicularly abutted panel member 20. The corner clip members 70 have tapered contact surfaces 75 to securely fasten the corner clip member 70 to the frame portions 30 and hold the perpendicularly oriented panel members 20 together. Again, the notches 50 in the frame portion 30 are slightly wider than the thickness of the corner clip members 70 to allow easy passage of the finger portion 77 of the clip member 70 through the notch 50. The lateral movement of the corner clip member 70 causes the tapered contact surfaces 75 thereof, to contact the interior edges 55 of the frame portion 30 of each abutted panel member 20, thereby drawing the perpendicularly abutted surfaces of the panel member 20 into close contact with each other. Preferably, several corner clip members 70 are employed to secure two panel members 20 together perpendicularly, as illustrated in FIGS. 11 and 12.

Figure 14:
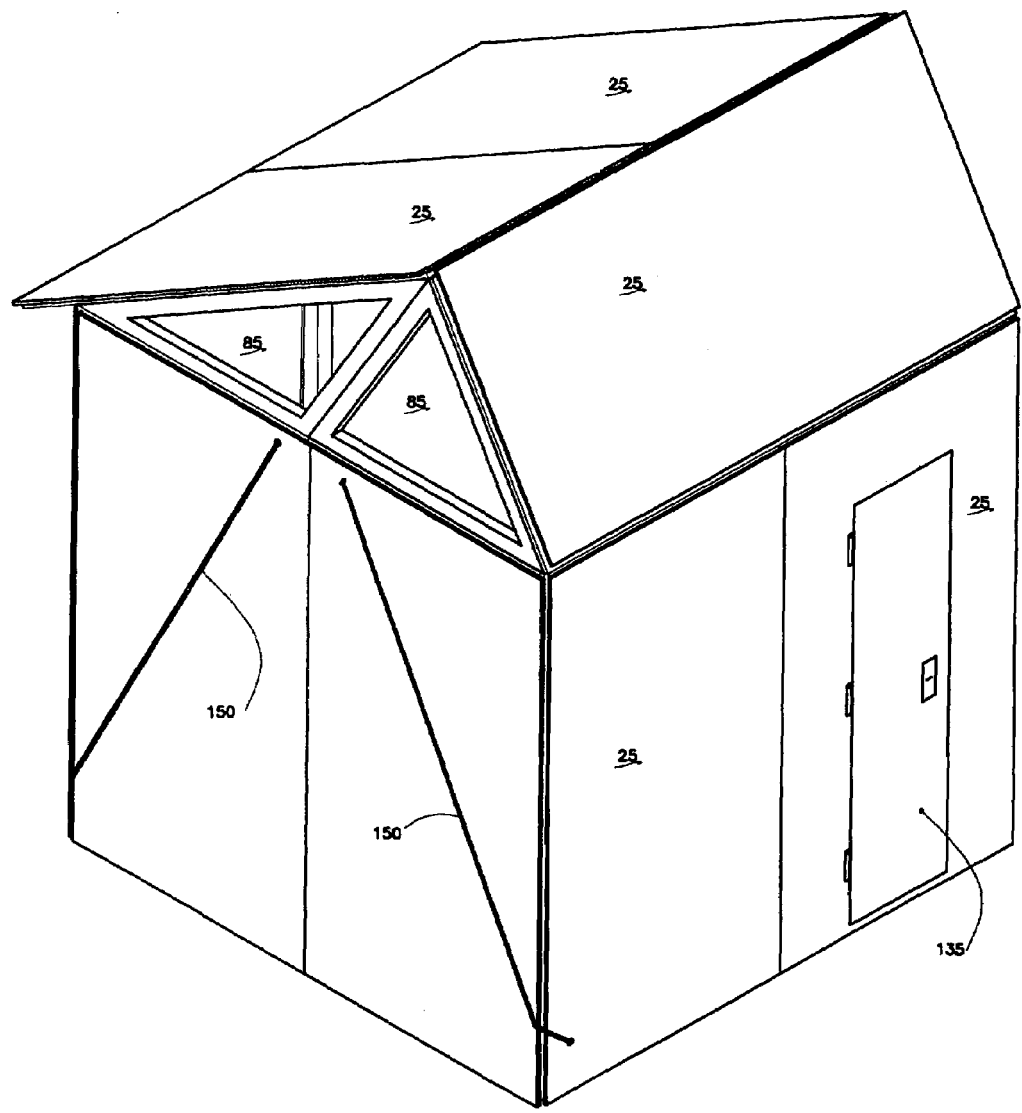
FIG. 14 is a perspective exterior view of a completed structure formed from rectangular and triangular panel members of the present invention.
Figure 18:
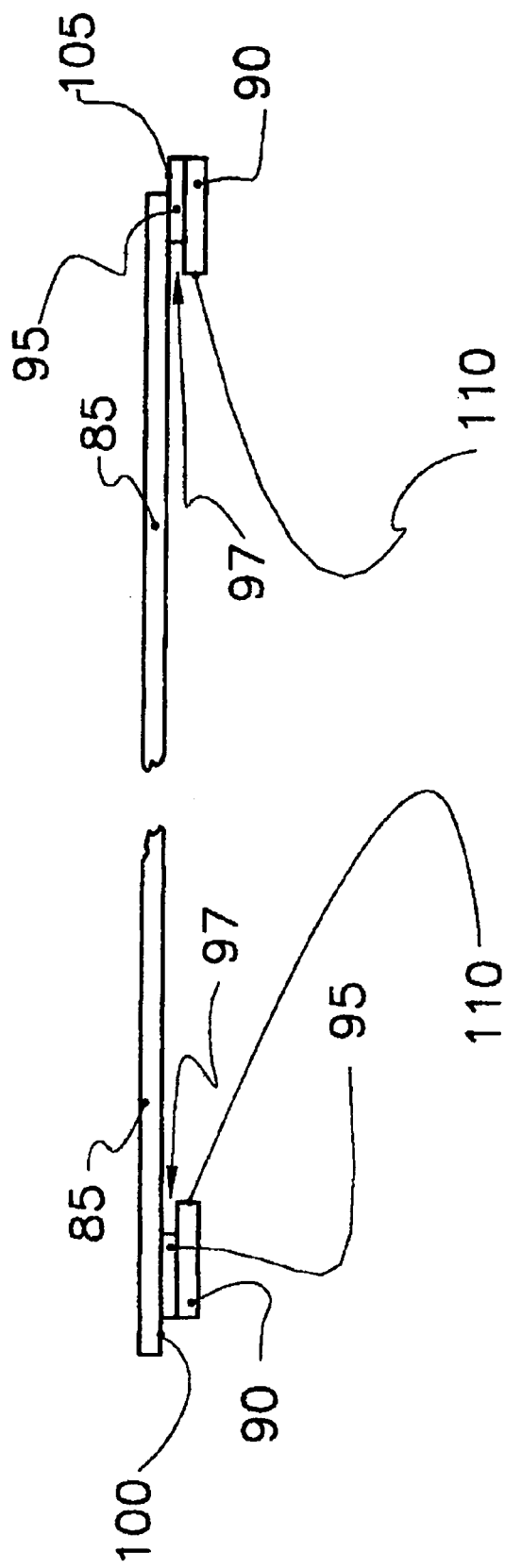
FIG. 18 is a cross sectional view along line 18-18' of FIG. 6 of the rectangular panel of the present invention.

Referring now to FIGS. 11, 12 and 14, a triangular panel member 80 is shown. The triangular panel member 80 is preferably a right triangle, with each side adjacent the right angle having a length of 4 feet. Alternatively, each side adjacent the right angle has a length of 3 feet. Alternatively, the triangular panel member 80 comprises an isosceles triangle, as illustrated in FIG. 6. The triangular panel member 80, likewise, includes a planar outer portion 85 and an inner frame portion 90 that is held in a spaced relationship from the planar outer portion 85 by a spacer portion 95. In this embodiment, a spacer portion 95 separates the inner frame portion 90 from the planar outer portion 85, as illustrated in FIG. 18, and forms an interior channel 97 between the outer portion 85 and the inner frame portion 90. The frame portion 90 is secured adjacent the peripheral edges 87 of the planar outer portion 85 and offset slightly from the edge 87 of the planar outer portion 85 opposite the right angle. Thus, the planar outer portion 85 forms a first lip section 100 on the side of the panel member 80 opposite the right angle, and the frame portion 90 forms lip sections 105 on the other two sides of the panel member 80, adjacent the right angle. Consequently, the side of the panel member 80 opposite the right angle can be abutted against one side of a rectangular panel member 20 to form an overlapping joint to provide a functional, weather tight seal there between, as illustrated in FIGS. 11 and 12.

The frame portion 90 of each triangular panel member 80 includes a plurality of notches 50 on the interior edge 95 thereof. The notches 50 are spaced around the entire interior edge 110 of the frame portion 90. When the triangular panel 80 is linearly abutted to a rectangular panel member 20, as shown in FIGS. 11 and 12, the notches 50 of the panel member's frame portion 90 are positioned such that the notches 50 align in pairs on the abutted frame portions 30, 90. A C-shaped clip member 60 having a linear slot 62 therein, as shown in FIGS. 7 and 8, is inserted over two aligned notches 50, and then the clip member 60 is laterally offset from the notches 50 to hold the two panel members 20, 80 together. The C-shaped clip member 60 includes finger portions 67, each of which fit into one of the interior channels 37, 97 between the interior edge 55, 110 of the frame portions 30, 90 and the planar outer portion 25, 85 of the abutted panel members 20, 80. The C-shaped clip members 60 have tapered contact surfaces 65 on the opposed portions, which contact the interior edges 55, 110 of the frame portions 30, 90 to securely fasten the C-shaped clip member 60 to the frame portions 30, 90 and hold the panel members 20, 80 together. The notches 50 in the frame portions 30, 90 are slightly wider than the thickness of the C-shaped clip members 60 to allow easy passage of the finger portion 67 of the clip member 60 through the notch 50. The lateral movement of the C-shaped clip member 60 causes the tapered contact surface 65 thereof to contact the interior edges 55, 110 of the frame portions 30, 90 of each abutted panel member 20, 80, thereby drawing the abutted surfaces of the panel members 20, 80 into close contact with each other. Preferably, several C-shaped clip members 60 are employed to secure the two panel members 20, 80 together, as illustrated in FIGS. 6, 11 and 12.

Figure 10:
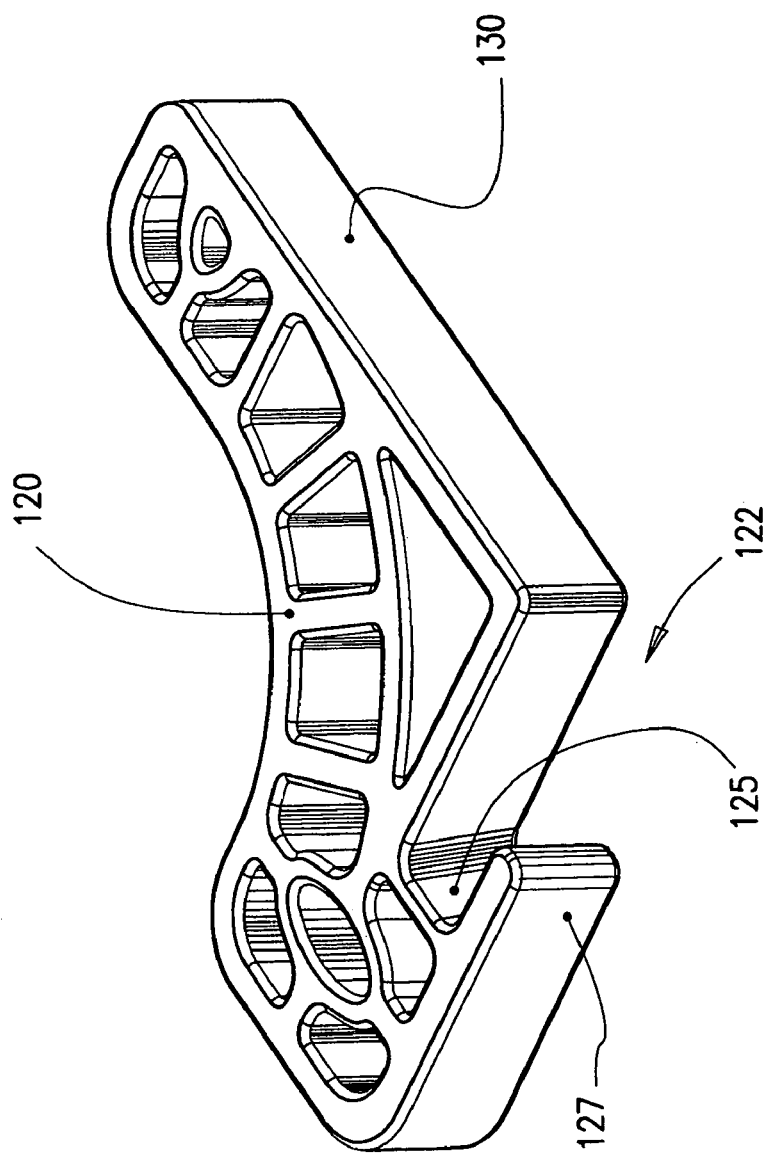
FIG. 10 is a perspective view of a foot clip member of the present invention.

Referring now to FIG. 10, a special foot clip member 120 is provided for attachment to a panel member edge portion, which rests on a horizontal surface. The foot clamp member 120 includes a linear slot 122 with a single, tapered contact surface 125 and a single finger portion 127 adjacent the linear slot 122. The foot clamp member 120 is secured to the frame portion 30 of a panel member 20 by inserting the linear slot 122 over a notch 50 in the frame portion 30, with the finger portion 127 positioned in the interior channel 37 of the frame portion 30. Laterally displacing the foot clamp member 120 relative to the notch 50 secures the foot clamp member 120 to the panel member 20. The planar outer contact surface 130 of the foot clamp member 120 contacts the horizontal support surface, thereby providing stability for the vertical panel member 20 attached thereto, as illustrated in FIGS. 11 and 12.

Figure 13:
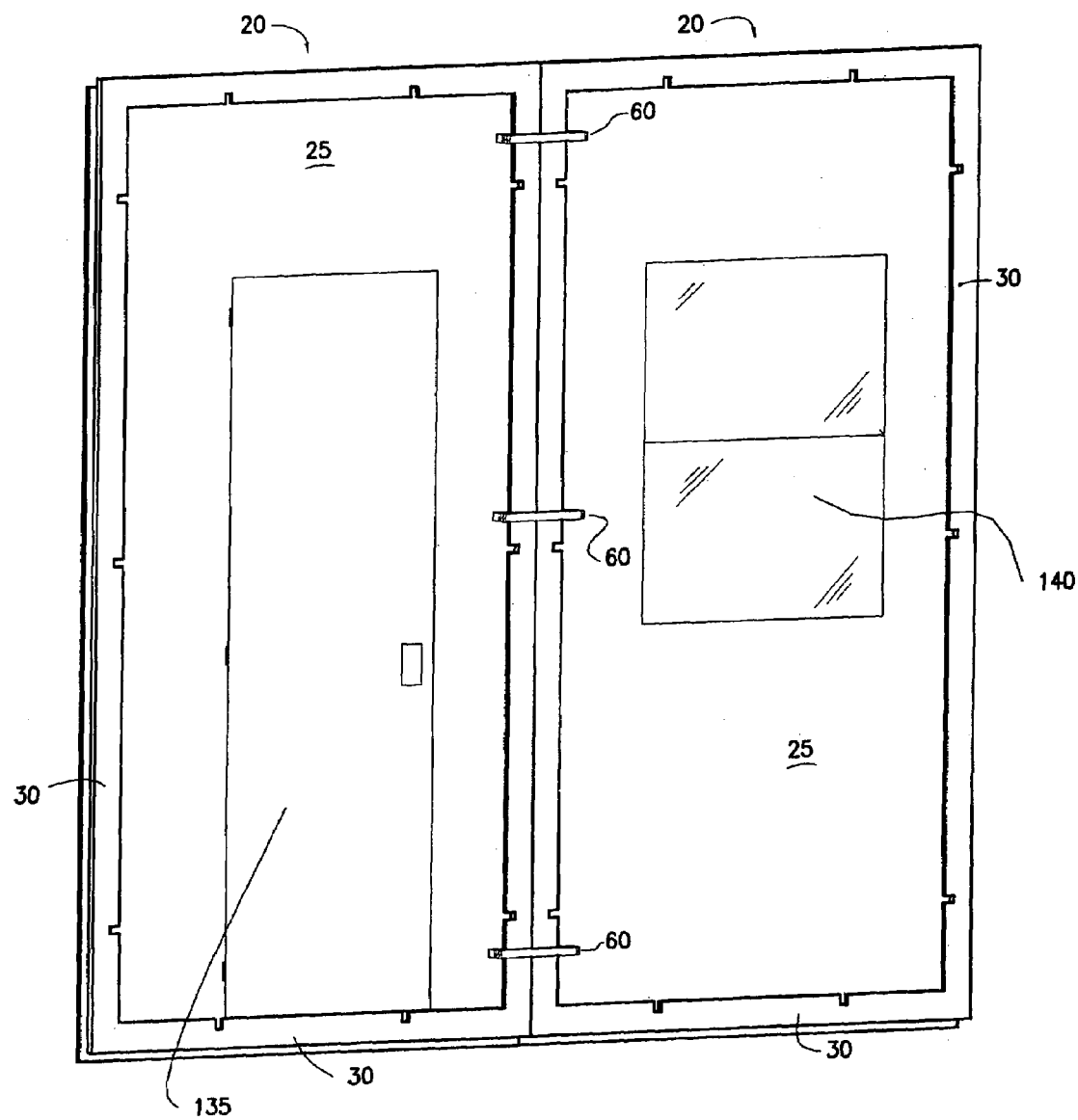
FIG. 13 is a perspective view of two abutted rectangular panel members of the present invention, one including a window and one including a door.

In a further embodiment of the invention, a vertically oriented, rectangular panel member 20 includes a large central area in which can be mounted a door member 135 or a window member 140. Because the panel members 20 are secured together by the frame members 30 mounted at the peripheral edges 27 of the panel members 20, the central area of the planar outer portion 25 is unobstructed and available for mounting an access opening, such as a door member 135, or a ventilation opening, such as a window member 140, as illustrated in FIG. 13. The opposite side of the partition assembly shows only the door member 135, as illustrated in FIG. 14.

Referring now to FIG. 14, an exterior view of a fully assembled structure, made up of both rectangular panel members 20 and triangular panel members 80, is shown. It is often desirable to provide additional bracing to strengthen the temporary structure. To increase structural integrity, flexible linear bracing members 150 are included. The flexible linear bracing members 150 comprise a rope, cable, strap or similar linear element that is fastened near one exterior corner of a rectangular panel member 20, with the bracing member 150 positioned diagonally on the panel member 20 and fastened to an exterior corner of an abutted panel member 20, as illustrated in FIG. 14. The bracing members 150 provide additional structural integrity for the perpendicularly abutted panel members 20. The added feature of panel members 20 with a door member 135 is also illustrated in FIG. 14.

To provide the greatest versatility for the building panel and clip system of the present invention, the rectangular building pane members 20 are fabricated in a variety of dimensions. The dimensions include rectangular building panel members 20, measuring 4 feet by 8 feet, 4 feet by 7 feet, 4 feet by 4 feet, 4 feet by 2 feet, 3 feet by 8 feet, 3 feet by 7 feet, 3 feet by 4 feet, 3 feet by 2 feet, 2 feet by 8 feet, 2 feet by 7 feet, and 2 feet by 2 feet.

Figure 15:
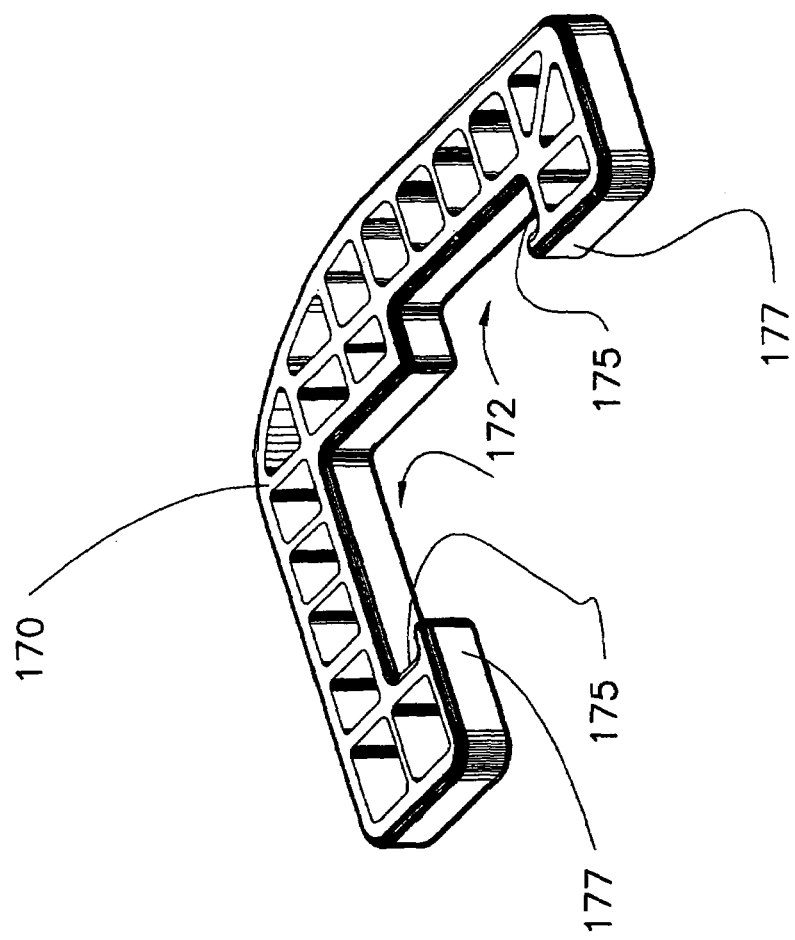
FIG. 15 is a perspective view of another L-shaped clip member of the present invention.
Figure 16:
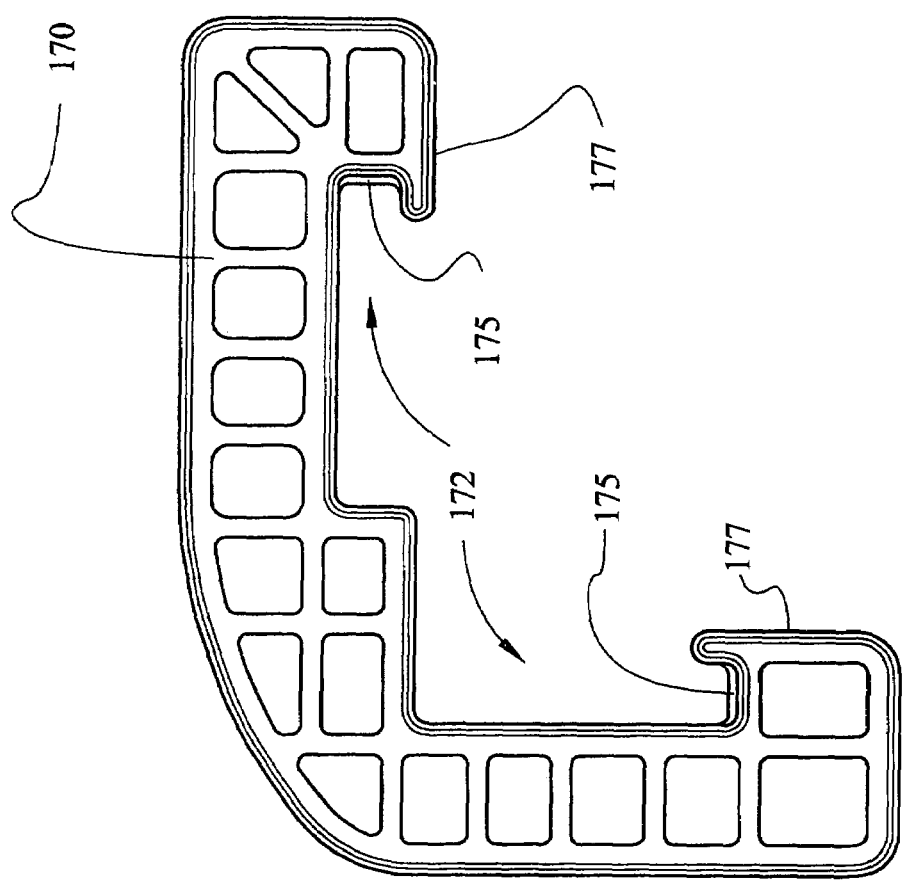
FIG. 16 is a top view of the another L-shaped clip member of FIG. 15 of the present invention.

Referring now to FIGS. 15 and 16, another embodiment of a corner clip member is shown. It is sometimes required that the rectangular panel members 20 be perpendicularly joined to form an inside corner. Such an inside corner positions the panel member's frame portions 30 on outside, opposite sides of the corner with the planar outer portions 25 of the panel member 20 on the inside, adjacent sides of the corner. In this panel configuration, an asymmetrical inside corner clip member 170, illustrated in FIGS. 15 and 16, is employed for securing the panel members 20 together. The inside corner clip member 170 includes an L-shaped slot 172 with tapered contact surfaces 175, positioned at 90 degrees to each other for contacting the interior edges 55 of the frame portions 30. The corner clip member 170 includes finger portions 177, each of which fit into the interior channel 37 between the interior edge 55 of the frame portion 30 and the planar outer portion 25 of one perpendicularly abutted panel member 20. The inside corner clip members 170 also have tapered contact surfaces 175 to securely fasten the inside corner clip member 170 to the frame portions 30 and hold the perpendicularly oriented, panel members 20 together. Again, the notches 50 in the frame portion 30 are slightly wider than the thickness of the inside corner clip members 170 to allow easy passage of the finger portion 177 of the inside clip member 170 through the notch 50. The lateral movement of the inside corner clip member 170 causes the tapered contact surfaces 175 thereof to contact the interior edges 55 of the frame portion 30 of each abutted panel member 20, thereby drawing the perpendicularly abutted surfaces of the panel member 20 into close contact with each other. Preferably, several interior corner clip members 170 are employed to secure two panel members 20 together, perpendicularly, in the inside corner orientation.

Figure 17:
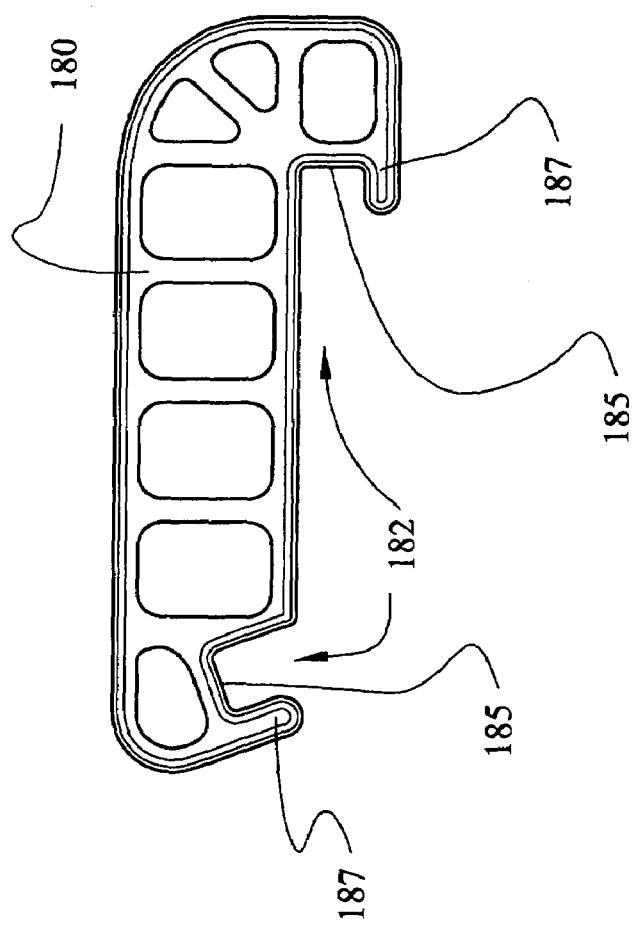
FIG. 17 is a top view of yet another L-shaped clip member of the present invention.

Referring now to FIG. 17, another clip member, a roof clip member 180, is illustrated. The roof clip member 180 is employed for joining two rectangular panel member 20 at the peak of a pitched roof or a vertically oriented, rectangular panel member 20 of a wall or partition to another rectangular panel member 20 of a pitched roof. A triangular panel member 80, used in the gabled end of the structure, determines the pitch of the roof panel member 20 relative to the vertically oriented, panel member 20. The frame portions 30 of each panel member 20 are positioned adjacent each other but, due to the pitch of the roof panel member 20, the angle between the panel's frame portions 30 is greater than 90 degrees. The roof clip member 180 securely fastens two rectangular panel member 20 at the peak of a pitched roof or a vertical wall panel member 20 to a pitched roof, panel member 20. The roof clip member 180 includes an angled L-shaped slot 182, with tapered contact surfaces 185 positioned at greater than 90 degrees to each other for contacting the interior edges 55 of the frame portions 30. The roof clip member 180 includes finger portions 187, each of which fit into the interior channel 37 between the interior edge 55 of the frame portion 30 and the planar outer portion 25 of one pitched, abutted panel member 20. The roof clip members 180 also have tapered contact surfaces 185 to securely fasten the roof clip member 180 to the frame portions 30 and hold the pitched panel members 20 together. Again, the notches 50 in the frame portion 30 are slightly wider than the thickness of the roof clip members 180 to allow easy passage of the finger portion 187 of the roof clip member 180 through the notch 50. The lateral movement of the roof clip member 180 causes the tapered contact surfaces 185 thereof, to contact the interior edges 55 of the frame portion 30 of each pitched, abutted panel member 20, thereby drawing the angularly abutted surfaces of the panel member 20 into close contact with each other. Preferably, several roof clip members 180 are employed to secure two panel members 20 together at the peak of a pitched roof or at the contact area between a rectangular wall panel 20 and a rectangular roof panel 20.

While the invention has been particularly shown and described with reference to preferred embodiments thereof, it will be understood by those skilled in the art that various changes in form and details may be made therein without departing from the spirit and scope of the invention.

We claim:

1. A building panel and clip system comprising:
    a plurality of building panel members of selected shape and selected dimensions, each panel member including a planar exterior portion and a planar peripheral frame portion spaced a selected distance from and attached to the exterior portion by a peripheral spacer portion, thereby forming an interior channel beneath an interior edge of the frame member, the frame portion containing a plurality of notches on the interior edge thereof, the frame portion laterally offset from the exterior portion, thereby forming a lip on at least two edges of the panel member; and
    a plurality of clip members for fastening abutted panel members together, each clip member including a slot for accepting frame portions therein and finger portions for positioning within the frame portion's interior channel, the clip member insertable over a pair of aligned frame notches on abutted panel members, the clip member spanning the frame portions of abutted panel members and displaced laterally on the frame portions relative to the aligned notches, with each clip member's finger portions secured within one frame portion's interior channel, thereby reversibly securing abutted panel members together.

2. The building panel and clip system of claim 1, wherein the frame portion laterally offset from the exterior portion forms a frame portion lip on two adjacent edges of the panel member.

3. The building panel and clip system of claim 1, wherein the frame portion laterally offset from the exterior portion forms an exterior portion lip on two adjacent edges of the panel member.

4. The building panel and clip system of claim 1, wherein the selected shape of the building panel members is selected from the group consisting of a rectangle and a triangle.

5. The building panel and clip system of claim 1, wherein the selected shape of the building panel members is rectangular with the dimensions selected from the group consisting of 4 feet by 8 feet, 4 feet by 7 feet, 4 feet by 4 feet, 4 feet by 2 feet, 3 feet by 8 feet, 3 feet by 7 feet, 3 feet by 4 feet, 3 feet by 2 feet, 2 feet by 8 feet, 2 feet by 7 feet, and 2 feet by 2 feet.

6. The building panel and clip system of claim 1, wherein the selected shape of the building panel members is triangular with the triangular panel member selected from the group consisting of a right triangle and an isosceles triangle.

7. The building panel and clip system of claim 1, wherein the selected shape of the building panel members is a right triangle with the dimension of each side adjacent the right angle selected from the group consisting of 3 feet and 4 feet.

8. The building panel and clip system of claim 1, wherein the clip member's slot includes a pair of tapered surfaces, each tapered surface contacting one frame portion's interior edge of abutted panel members.

9. The building panel and clip system of claim 8, wherein the clip member's slot is linear with the pair of tapered surfaces in opposition to each other for securing collinear abutted panel members.

10. The building panel and clip system of claim 8, wherein the clip member's slot is L-shaped with the pair of tapered surfaces positioned at 90 degrees to each other for securing perpendicularly abutted panel members.

11. The building panel and clip system of claim 1, wherein at least one panel member is rectangular and the at least one rectangular panel member further includes an opening in the planar exterior portion thereof, the opening selected from the group consisting of a door and a window.

12. The building panel and clip system of claim 1, further including a linear reinforcing member secured between perpendicularly abutted panel members at a corner of a structure.

13. A building panel and clip system comprising:
    a plurality of rectangular building panel members of selected dimensions, each panel member including a planar exterior portion and a planar peripheral frame portion spaced a selected distance from and attached to the exterior portion by a peripheral spacer portion, thereby forming an interior channel beneath an interior edge of the frame member, the frame portion containing a plurality of notches on the interior edge thereof, the frame portion laterally offset from the exterior portion, thereby forming a frame portion lip on two adjacent edges of the panel member and an exterior portion lip on two adjacent edges of the panel member; and a plurality of clip members for fastening abutted panel members together, each clip member including a slot for accepting frame portions therein and finger portions for positioning within the frame portion's interior channel, the clip member insertable over a pair of aligned frame notches on abutted panel members, the clip member spanning the frame portions of abutted panel members and displaced laterally on the frame portions relative to the aligned notches, with each clip member's finger portions secured within one frame portion's interior channel, thereby reversibly securing abutted panel members together.

14. The building panel and clip system of claim 13, wherein the selected shape of the building panel members is rectangular with the dimensions selected from the group consisting of 4 feet by 8 feet, 4 feet by 7 feet, 4 feet by 4 feet, 4 feet by 2 feet, 3 feet by 8 feet, 3 feet by 7 feet, 3 feet by 4 feet, 3 feet by 2 feet, 2 feet by 8 feet, 2 feet by 7 feet, and 2 feet by 2 feet.

15. The building panel and clip system of claim 13, wherein the clip member's slot includes a pair of tapered surfaces, each surface contacting one frame portion's interior edge of abutted panel members.

16. The building panel and clip system of claim 15, wherein the clip member's slot is linear with the pair of tapered surfaces in opposition to each other for securing collinear abutted panel members.

17. The building panel and clip system of claim 15, wherein the clip member's slot is L-shaped with the pair of tapered surfaces positioned at 90 degrees to each other for securing perpendicularly abutted panel members.

18. The building panel and clip system of claim 13, wherein at least one panel member further includes an opening in the planar exterior portion thereof, the opening selected from the group consisting of a door and a window.

19. The building panel and clip system of claim 13, further including a linear reinforcing member secured between perpendicularly abutted panel members at a corner of a structure.

20. A building panel and clip system comprising:

a plurality of rectangular building panel members of selected dimensions, each panel member including a planar exterior portion and a planar peripheral frame portion spaced a selected distance from and attached to the exterior portion by a peripheral spacer portion, thereby forming an interior channel beneath an interior edge of the frame member, the frame portion containing a plurality of notches on the interior edge thereof, the frame portion laterally offset from the exterior portion, thereby forming a frame portion lip on two adjacent edges of the panel member and an exterior portion lip on two adjacent edges of the panel member, at least one of the rectangular panel members including a door opening in the planar exterior portion thereof, and a plurality of clip members for fastening abutted panel members together, each clip member including a slot for accepting frame portions therein and finger portions for positioning within the frame portion's interior channel, the clip member's slot including a pair of tapered surfaces, the clip member insertable over a pair of aligned frame notches on abutted panel members, the clip member spanning the frame portions of abutted panel members and displaced laterally on the frame portions relative to the aligned notches with each tapered surface contacting one frame portion's interior edge, with each clip member's finger portions secured within one frame portion's interior channel, thereby reversibly securing abutted panel members together.

* * * * *